(12) United States Patent
Saendig

(10) Patent No.: US 7,196,319 B2
(45) Date of Patent: Mar. 27, 2007

(54) POSITION-MEASURING DEVICE

(75) Inventor: Karsten Saendig, Palling (DE)

(73) Assignee: Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/946,986

(22) Filed: Sep. 21, 2004

(65) Prior Publication Data
US 2005/0067561 A1 Mar. 31, 2005

(30) Foreign Application Priority Data
Sep. 26, 2003 (DE) .................. 103 46 380

(51) Int. Cl.
G01D 5/34 (2006.01)
G01D 5/36 (2006.01)
G01B 11/24 (2006.01)
G01B 11/14 (2006.01)

(52) U.S. Cl. ............... 250/231.13; 250/231.14; 250/237 G; 356/616

(58) Field of Classification Search ............... 250/231.13–231.18, 237 G; 356/614, 616, 356/617, 496–499; 33/1 N, 1 PT
See application file for complete search history.

(56) References Cited
U.S. PATENT DOCUMENTS
2004/0232320 A1* 11/2004 Holzapfel et al. ..... 250/231.13

FOREIGN PATENT DOCUMENTS
WO WO 03/021185 A1 3/2003

* cited by examiner

Primary Examiner—Stephone B. Allen
Assistant Examiner—Suezu Ellis
(74) Attorney, Agent, or Firm—Kenyon & Kenyon LLP

(57) ABSTRACT

A position-measuring device for generating a measuring signal includes a track, which has an incremental graduation having a specified graduation period that extends along a measuring direction, having at least one discontinuity of the incremental graduation at a reference position for generating a reference signal and having a scanning unit movable relative to the track along the measuring direction, for scanning the incremental graduation, the at least one discontinuity formed by a modification of a transverse substructure of the incremental graduation that extends perpendicular to the measuring direction, and that deflects radiation beams originating from the scanning unit. The deflection direction at the discontinuity deviates from the deflection direction in other regions of the incremental graduation. The scanning unit includes at least two reference-pulse detectors provided for receiving radiation beams having a different deflection direction. Upstream of the reference-pulse detectors, at least one imaging optics system is arranged in the beam path of the respective deflected radiation beam.

57 Claims, 12 Drawing Sheets

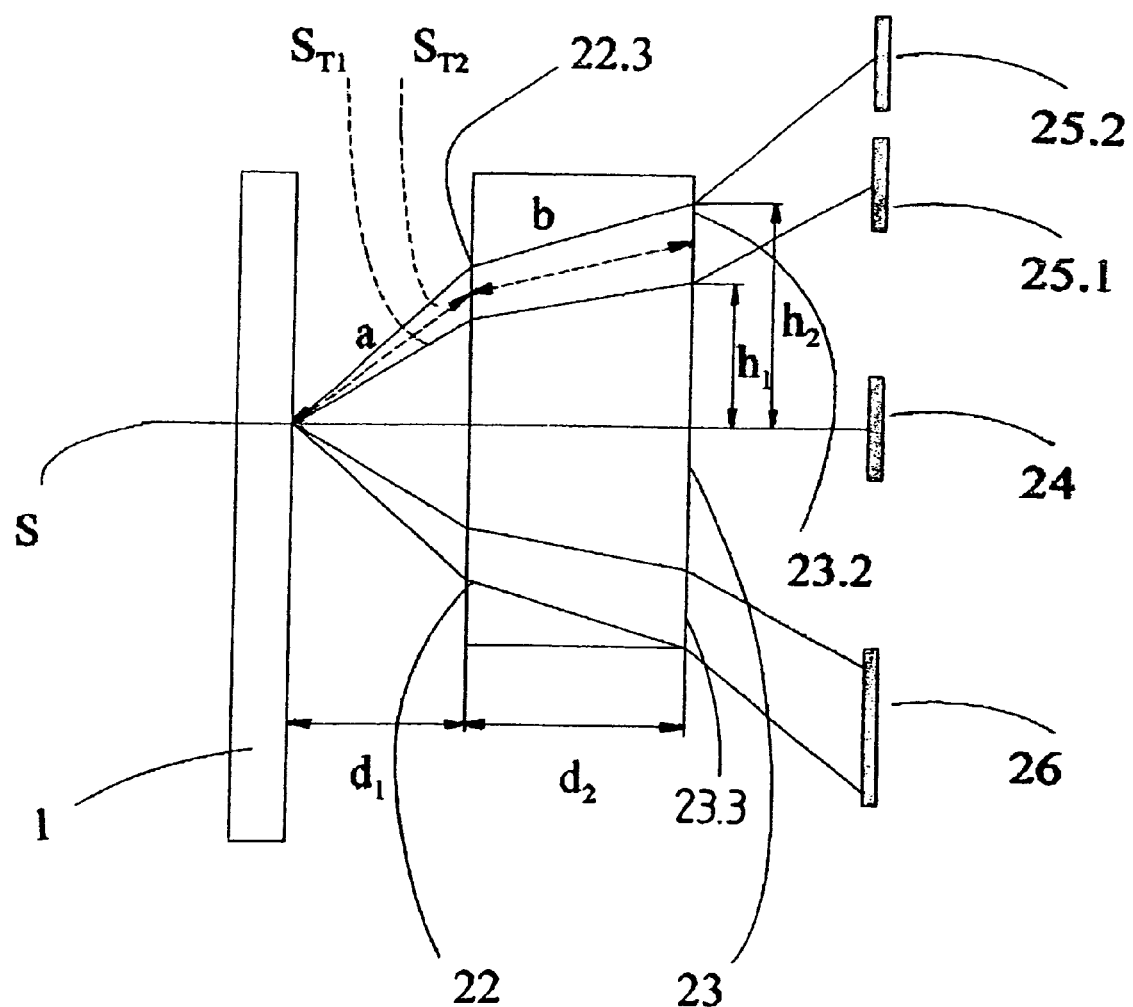

POSITION-MEASURING DEVICE

CROSS-REFERENCE TO RELATED APPLICATIONS

The present application claims priority to Application No. 103 46 380.1, filed in the Federal Republic of Germany on Sep. 26, 2003, which is expressly incorporated herein in its entirety by reference thereto.

FIELD OF THE INVENTION

The present invention relates to a position-measuring device for generating measuring signals.

BACKGROUND INFORMATION

Such a position-measuring device includes a track which has an incremental graduation extending along a measuring direction having a specified graduation period which is provided at at least one reference position with a discontinuity for generating a reference signal, as well as a scanning device, movable along the measuring direction with respect to the track for the (photoelectric) scanning of the track. In this context, the discontinuity is formed by the modification of a transverse substructure of the incremental graduation that extends perpendicular to the measuring direction, which deflects radiation beams originating from the scanning unit (by diffraction) having one component perpendicular to the measuring direction (transverse), the deflection direction at the discontinuity deviating from the deflection direction in the other regions of the incremental graduation; and the scanning unit having at least one reference pulse detector element, e.g., at least two reference pulse detector elements, which are provided having a different deflection direction for receiving radiation beams.

The perpendicular extension of the transverse substructures with respect to the measuring direction does not mean necessarily, in this context, that the transverse substructures have to extend exactly perpendicularly to the measuring direction. Rather, it is only required that the transverse substructures have at least one component in their characteristic that extends perpendicular to the measuring direction.

A position-measuring device described in PCT International Published Patent Application No. WO 03/021185 includes, for the generation of periodic incremental signals as well as at least one reference-pulse signal, a scale having a track in which a periodic incremental graduation is developed having a certain incremental graduation period, which extends along a measuring direction, and which has a discontinuity with respect to an optical property for the generation of a reference-pulse signal, as well as of a scanning unit which is movable relative to the scale in the measuring direction over a certain measuring path, and which, besides a light source, includes several detector elements for photoelectric scanning of the incremental graduation. In this context, in a first section of the measurement path, the incremental graduation has a first transverse substructure which deflects incident radiation beams into at least a first spatial direction; and in a second section of the measurement path, the incremental graduation has a second transverse substructure which deflects incident radiation beams into at least a second spatial direction that differs from the first spatial direction, so that in the transition range between the first and second section there exists a discontinuity with respect to the optical deflection action of the transverse substructures of the incremental graduation. In this context, in the various spatial directions, on the side of the scanning unit, reference-pulse detector elements are situated at which partial reference-pulse signal are present from whose processing the reference-pulse signal results.

Alternatively to the use of several (at least two) reference pulse detector elements, a reference pulse detector element being assigned to each radiation beam of a different deflection direction, a position-measuring device of the type described above can also be operated using a reference pulse detector element which is assigned to one of the radiation beams having a different deflection direction. With the aid of the illumination or non-illumination of this single reference-pulse detector element, it may then be determined whether the reference position is just being crossed.

In a conventional position-measuring device, the generation of a reference-pulse signal is derived from a reference mark that is integrated in the incremental track. For this, the graduation marks of the incremental graduation that is to be scanned have a transverse structuring (so-called transverse substructures) along their direction of extension (perpendicular to the measuring direction). The lateral boundary lines of the graduation marks are periodically modulated in the longitudinal direction, having a defined transverse graduation period. At the at least one reference position, the transverse graduation period changes and the reference mark is defined by this point of sudden discontinuity.

The transverse substructures bring about a deflection of the radiation beams impinging upon them (by diffraction) even in the transverse direction (perpendicular to the measuring direction). The degree of deflection depends, in this case, on the respective transverse graduation period, and accordingly it changes at the reference position formed by a point of sudden discontinuity of the graduation period. A certain detector element in the form of a photo element is spatially assigned respectively to the different transverse graduation periods. In the case of crossing the reference position in a relative movement of the scale with respect to the scanning unit of the position-measuring device, the deflection effect on the radiation beams changes such that by this time the respectively other detector element is acted upon. From the signal pattern (pattern of the partial reference-pulse signals at the at least two detector elements, a reference-pulse signal may then be derived by signal connection, as is explained in PCT International Published Patent Application No. WO 03/021185.

Integration of a reference mark into the incremental track may provide that greater tolerances of added construction may be allowed during assembly of the respective position-measuring devices. In this context, the arrangement described in PCT International Published Patent Application No. WO 03/021185 makes certain that the incremental signal is not interfered with by the reference mark.

SUMMARY

According to an example embodiment of the present invention, a position-measuring device may be improved with respect to the spatial resolution of the reference-pulse signal.

According to an example embodiment of the present invention, it may be provided to position an imaging optics device in the beam path of the (transversely) deflected radiation beams used for the generation of the reference-pulse signal.

By doing this, the spatial resolution in the generation of the reference-pulse signal may be improved to such an extent that it is equal to the spatial resolution in the generation of the incremental signal.

The imaging optics device is used, on the one hand, for imaging, onto a specifiable imaging plane, the ranges of the track having the incremental graduation that are each illuminated with the aid of the scanning unit, and, for this, it has at least one cylindrical lens, e.g., in the form of a Fresnel cylindrical lens, on a first scanning plate. According to an example embodiment of the present invention, two cylindrical lenses, situated one behind the other, may also be provided to be situated in the beam path of the deflected radiation beams, which form a cylindrical telescope, so that a correspondingly large imaging scale may be achieved.

In the imaging plane, on a second scanning plate, at least one slit is provided onto which the radiation of the individual radiation beams (after interaction with the at least one (Fresnel) cylindrical lens) impinges and it supplies the radiation made of the radiation beams using a different deflection direction (by diffraction) to different reference-pulse detector elements.

In this context, the radiation of differently deflected radiation beams, when viewed in the direction of extension of the respective slit, impinges on different locations of the at least one slit, the at least one slit extending perpendicularly to the measuring direction.

According to an example embodiment of the present invention, the imaging plane is situated at a distance from the reference-pulse detector elements in the beam path of the radiation beams. According to an example embodiment of the present invention, the reference-pulse detector elements are arranged essentially in the imaging plane, so that the respective slit or the respective slits are to be situated immediately above the photo elements (for example, physically connected to them).

The incremental graduation itself may be formed by markings (in the form of graduation marks) that are periodically positioned one after another and are separated from one another by intermediate areas. By periodic positioning is understood, in this connection, such a positioning of the markings that they have, for example, a constant center-to-center distance (defined by the graduation period) or that they have another uniquely definable distance that repeats periodically. By contrast, the concept of periodicity should not be understood in this connection as if the incremental graduation as a whole, including the shape of the individual markings, had to form a completely periodic pattern along the measuring direction. For the formation of a reference mark at at least one reference position, corresponding discontinuity locations in the incremental graduation may be provided.

The individual markings of the incremental graduation may extend (as graduation marks) in a direction perpendicular to the measuring direction, e.g., for a rotational measuring direction the individual markings may extend radially, and they may be situated along the measuring direction one after the other, e.g., sequentially.

The transverse substructure may be formed by modulation of the long sides of the markings, especially in a way such that a (periodic) width-modulation of the markings comes about, and indeed particularly preferably on the basis of a sine function.

The modification of the transverse substructure, so as to obtain differently deflected radiation beams, may be done such that the modulation of at least one long side of a marking is varied compared to additional markings, e.g., by changing the period of a periodic modulation.

According to an example embodiment of the present invention, exactly one marking of the incremental graduation has a transverse substructure, which deviates from the transverse structure of the other markings, and which, for the formation of a reference mark or for the generation of a reference signal pulse at the reference position, defines a discontinuity.

According to an example embodiment of the present invention, for the formation of the discontinuity in the surroundings of the reference position, several markings are provided with a transverse substructure which deviates from the transverse substructure of the remaining markings of the incremental graduation, the distances between adjacent markings having a deviating transverse substructure differ such that one and the same distance between adjacent markings having deviating transverse substructures does not appear. In this example embodiment, the number of slits in the imaging plane may correspond to the number of markings having a deviating transverse substructure. The distance between the individual slits is determined, in this context, as a function of the distance between the markings, taking into consideration other geometric variables of the imaging optics, such as the focal length.

According to an example embodiment of the present invention, the track to be scanned by the scanning unit and having the incremental graduation, has at least two sectors, in each of the at least two sectors a different transverse substructure being provided. In this case, the discontinuity at the at least one reference position is defined by the transition from one sector to another sector of the track.

According to an example embodiment of the present invention, for the formation of a code track having absolute position information, markings having a deviating transverse substructure may be distributed along the measuring directions such that a code corresponding to a PRC code comes about. In this context, a certain detector element is assigned respectively to all long sides of markings that have an agreeing transverse substructure. Thus if, for example, for the formation of the codes, only two different types of transverse substructures are used, which are distributed appropriately to the (long sides of the) individual markings, two detector elements are required, of which each is assigned to one of the two types of transverse substructures.

The assigned detector elements are formed, in this case, e.g., by one periodic arrangement of active surfaces, which are developed to receive the respective radiation beams.

In example embodiments of the present invention, the different reference-pulse detector elements may be connected to one another in a push-pull manner, in order to form a reference-pulse signal, that is to be passed on, from the output signals at the individual reference-pulse detector elements (partial reference-pulse signals).

Since, because of the transverse deflection effect of the transverse substructures, the deflected light is split, also with regard to positive and negative orders of diffraction (and not only with regard to the type of transverse substructure provided at the respective place), two diffraction branches come about, in which, e.g., in each case an imaging optics system of the kind described above may be provided.

In this context, the radiation beams extending in the one diffraction branch, that are, depending on the deflection direction, brought on by different transverse structures, are conducted to one of several reference-pulse detector elements provided for this purpose. In the other diffraction branch, by contrast, all the radiation beams, independent of their deflection direction, are guided to a uniform detector element, which is used to generate a steady radiation level of constant intensity. The last-named detector element does not, in this context, absolutely have to be formed by a single physical detection device. The respective detector element may be arranged such that it generates a signal from the incident radiation beams, which corresponds to the entire radiation of the respective radiation beams, independent of the spatial distribution, and is not, for example, a function of the spatial distribution of the radiation beams, as is the case in the other diffraction branch.

The steady radiation signal generated by the last-named detector element is combined with the output signals (partial reference-pulse signals) of the individual reference-pulse detector elements, for the formation of the reference-pulse signal.

Example embodiments of a method for carrying out a position measurement, e.g., using the position-measuring device according to an example embodiment of the present invention, are described herein.

According to an example embodiment of the present invention, a position-measuring device for generating measuring signals includes: a track including an incremental graduation having a specified graduation period and extending along a measuring direction, at least one discontinuity of the incremental graduation arranged at a reference position to generate a reference signal; a scanning unit movable relative to the track along the measuring direction configured to scan the incremental graduation by radiation beams; and at least one imaging optics system. The at least one discontinuity is formed by a modification of a transverse substructure, extending in a perpendicular manner to the measuring direction, of the incremental graduation arranged to deflect radiation beams that originate from the scanning unit. A deflection direction deviates at the discontinuity from a deflection direction in other regions of the incremental graduation. The scanning unit includes at least one reference-pulse detector element configured to receive one of the radiation beams having a different deflection direction. The at least one imaging optics system is arranged in a beam path of a respective deflected radiation beam.

The imaging optics system may be configured to image areas of the track, irradiated by the scanning unit, onto a predefined imaging plane.

The imaging optics system may be configured to image areas of the track, irradiated by the scanning unit, and may include at least one cylindrical lens, e.g., a Fresnel cylindrical lens.

The imaging optical system may include at least two cylindrical lenses arranged one behind the other in the beam path of the deflected radiation beams.

The imaging plane may include at least one slit on which radiation of two radiation beams of different deflection direction is arranged to impinge and which is arranged to supply radiation from radiation beams having a different deflection direction to different reference-pulse detector elements.

Radiation of differently deflected radiation beams may be arranged to impinge on different locations of the slit.

The differently deflected radiation beams may be arranged to impinge upon different places along an extension direction of the slit.

The at least one slit may extend in a direction perpendicular to the measuring direction.

The imaging plane may be arranged in the beam path of the radiation beams at a distance from the at least one reference-pulse detector element.

The at least one reference-pulse detector element may be substantially located in the imaging plane.

The scanning unit may include at least two reference-pulse detector elements for radiation beams having a different deflection direction.

The at least two reference-pulse detector elements may be arranged in one plane.

The incremental graduation may include periodic markings arranged one behind the other, and intermediate areas may be arranged between the periodic markings.

Exactly one of the periodic markings may include a transverse substructure that deviates from the transverse substructure of other periodic markings and that defines the discontinuity.

A plurality of the periodic markings may be arranged in a surrounding area of the at least one reference position corresponding to the discontinuity and may include a transverse substructure that deviates from the transverse substructure of other periodic markings and that defines the discontinuity.

The track may include at least two sectors, and each sector may include a different transverse substructure of the incremental graduation.

The transverse substructure may be configured to form two diffraction branches from the radiation beam emitted by the scanning unit. A first diffraction branch may include radiation beams deflected by the transverse substructure and supplied to respective first reference-pulse detector elements, and a second diffraction branch may include radiation beams supplied to a second reference-pulse detector element in a uniform manner.

The second reference-pulse detector element may be configured to generate a constant light level.

The position-measuring device may include an arrangement, e.g., a comparator, configured to combine output signals of the first reference-pulse detector elements and an output signal of the second reference-pulse detector element to generate a reference-pulse signal.

Imaging optics may be arranged in each beam path of the two diffraction branches.

According to an example embodiment of the present invention, a method for position-measurement with a track that includes an incremental graduation extending along a measuring direction and including a predefined graduation period, the track including at least one reference position having a discontinuity arranged to generate a reference signal, the discontinuity formed by a modification of a transverse substructure of the track that extends perpendicular to the measuring direction, includes: moving the track along the measuring direction relative to a scanning unit; scanning the track with the scanning unit; deflecting, by an imaging optics system, radiation beams that originate from the scanning unit, a deflection direction at the discontinuity deviating from a deflection direction at other locations of the track; and receiving the deflected radiation beams at a respective reference-pulse detector element of the scanning unit.

The radiation beams may be deflected in the deflecting step by diffraction.

The method may include imaging the transverse substructure by the imaging optics system onto a plane.

The method may include: forming two diffraction branches from the radiation beam emitted by the scanning unit by the transverse substructure; supplying radiation beams included in a first diffraction branch and deflected by the transverse substructure to a respective first reference-pulse detector element; and supplying radiation beams included in a second diffraction branch to a second reference-pulse detector element in a uniform manner.

The method may include combining output signals of the first reference-pulse detector elements with an output signal of the second reference-pulse detector element to generate a reference-pulse signal.

Other features and aspects are set forth in the following description of exemplary embodiments of the present invention with reference to the appended Figures.

BRIEF DESCRIPTION OF THE DRAWINGS

FIG. 2b illustrates a scanning plate of the position-measuring device for use in the case of a track of the kind illustrated in FIG. 2a.

FIG. 3a illustrates a first variation of the track illustrated in FIG. 2a.

FIG. 3b illustrates a scanning plate of the position-measuring device for use in the case of a track of the kind illustrated in FIG. 3a.

FIG. 4a illustrates a second variation of the track illustrated in FIG. 2a.

FIG. 4b illustrates a scanning plate of the position-measuring device for use in the case of a track of the kind illustrated in FIG. 4a.

FIG. 5 is a schematic side view of a position-measuring device illustrated in FIG. 1.

FIG. 9a illustrates an example embodiment of the track illustrated in FIG. 4a.

FIG. 9b illustrates a scanning plate for use with a position-measuring device having a track of the kind illustrated in FIG. 9a.

DETAILED DESCRIPTION

Figure 1:
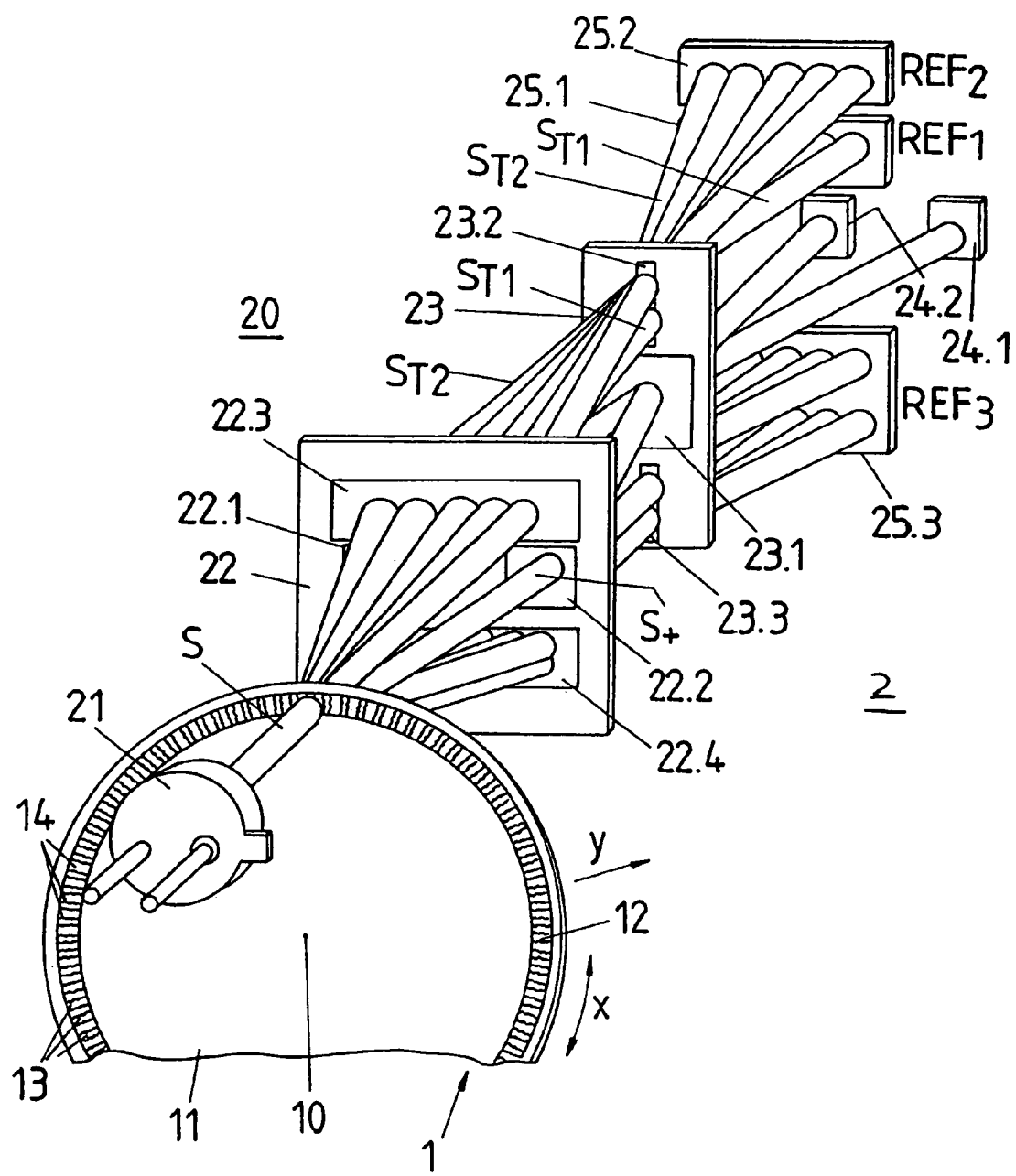
FIG. 1 is a perspective view of a position-measuring device, having a scale developed as a graduated disk and a scanning unit for photoelectric scanning of the scale, and including the radiation beams generated during the scanning.

FIG. 1 schematically illustrates an exemplary embodiment of a position-measuring device which is used as an angle measuring device for recording rotatory motions (i.e., the angle of rotation) of two objects rotatable with respect to each other about a rotary axis 10. The position-measuring device includes a scale 1, as well as an assigned scanning unit 2 which are to be connected in each case to one of the two objects. The measuring direction x, along which the two objects are movable relative to each other (that is, rotatable), extends in a circular manner, namely rotationally symmetrically to axis of rotation 10.

Scale 1, which may be a first of the two objects that are movable with respect to each other, is formed as a graduated disk made up of a disk-shaped carrier element 11 made of glass, upon which a track 12 is disposed having an incremental graduation in the shape of a circle in the circumferential direction. The incremental graduation includes a plurality of markings 13, that are periodically disposed one behind the other along the measuring direction x at an incremental graduation period, which differ from intermediate area 14, arranged in each case between two markings 13, in their optical properties (e.g., transmission of light). Markings 13 and intermediate areas 14 arranged between them each have a longitudinal dimension along a direction y extending radially to rotational axis 10, which extends perpendicularly to measuring direction x.

In the case at hand, the incremental graduation formed by markings 13 and intermediate areas 14 arranged between them is formed as a transmitted light phase splitter, i.e., the successive markings 13 and intermediate areas 14 each have a different phase-shifting optical effect on radiation beams that are passing through. Alternatively to phase splitting, for the formation of an incremental graduation (for reflected light or transmitted light), so-called division of amplitude may also be used.

Scanning unit 2, arranged as the other of the two objects that are movable with respect to each other has a radiation source in the form of a light source 21, as well as an imaging optics device 20, with the aid of radiation S emitted by light source 21, which interacts with track 12 of graduated disk 1, and is guided to different detector elements 24.1, 24.2, 25.1, 25.2, 25.3, which are used for generating scanning signals.

Three incremental signal detector elements, of which in FIG. 1 only two incremental signal detectors 24.1, 24.2 are illustrated, are used to record the periodic incremental signals generated using the incremental graduation of track 12, in response to the interaction of collimated radiation beam S (in the form of a laser beam generated by a laser diode as light source 21). Incremental signal detector elements 24.1, 24.2 may be designed in a conventional manner as so-called structured detectors, or alternatively as a system of a plurality of individual photo elements.

With the aid of three incremental-signal detector elements (among them 24.1, 24.2), three incremental signals each phase-shifted by 120° with respect to one another may be generated in a conventional manner, which are interconnected to form two incremental output signals phase-shifted by 90° with respect to each other. For simplicity (periodic) incremental signals are mentioned below.

Where additional detector elements 25.1, 25.2, 25.3 reference-pulse detector elements are involved, at which partial reference-pulse signals $REF_1$, $REF_2$ and $REF_3$ are present, from which a reference-pulse signal is generated in a manner that will be explained below. Reference-pulse detector elements 25.1, 25.2, 25.3 may be arranged as photo elements.

The incremental signals and the reference-pulse signals generated by the position-measuring device are supplied to an evaluation unit, for example, to a control unit of a numerical machine tool, for further processing.

The function of the position-measuring device illustrated in FIG. 1 is explained in greater detail below.

A radiation beam S, generated by radiation source 21 in the form of a laser diode, in the form of a collimated laser beam impinges upon track 12 having incremental graduation 13, 14, on scale 1 developed as a graduated disk. For the generation of the incremental signals, incident radiation beam S is split by diffraction at the incremental graduation into two partial radiation beams $S_{+1}$, and $S_{-1}$ in measuring direction x (longitudinal), which correspond to the first and minus first diffraction order, and which spread in two different spatial directions. On the part of the scanning unit, the two partial radiation beams $S_{+1}$ and $S_{-1}$ encounter in each case a scanning division 22.1, 22.2 of a first scanning plate 22 in the form of a scanning grid (divided 1:1; (maximum) phase angle deviation 180°). From scanning divisions 22.1, 22.2 of first scanning plate 22, the two partial radiation beams $S_{+1}$ and $S_{-1}$ are deflected by diffraction, so that they come together in the plane of a second scanning plate in the form of a scanning grid onto a scanning division 23.1 (divided 1:1; (maximum) phase angle deviation 120°). There, the respective first diffraction orders are superimposed on one another as well as respectively a zero'th one having a second diffraction order superimposed on it. The three partial radiation beams resulting from this are incident upon one detector element each 24.1, 24.2 (third detector element in FIG. 1 is covered) in the form of a photo element. The phase positions of the interfering first diffraction orders as well as the interfering zero'th and second diffraction orders are, in this context, each offset by 120°. Thus are created, with respect to scanning unit 2, by a relative motion of scale 1 in the form of a graduated disk, three signals phase-shifted by 120° with respect to one another, which are electronically connected such that a sine signal as well as a cosine signal is obtained from this.

For further details on such a position-measuring device, reference is made to PCT International Published Patent Application No. WO 03/021185, which is expressly incorporated herein in its entirety by reference thereto.

Besides the periodic incremental signals explained above, the position-measuring device illustrated in FIG. 1 may also be used for generating a reference-pulse signal along track 12, by a reference position formed by a discontinuity. With the aid of this reference-pulse signal an absolute reference may be produced during the measurement, to which a subsequent incremental measurement may then referred.

For this purpose, such a formation of incremental graduation 13, 14 is provided, in order to generate a reference-pulse signal by at least one discontinuity with respect to an optical property at at least one +-reference position.

Figure 2A:
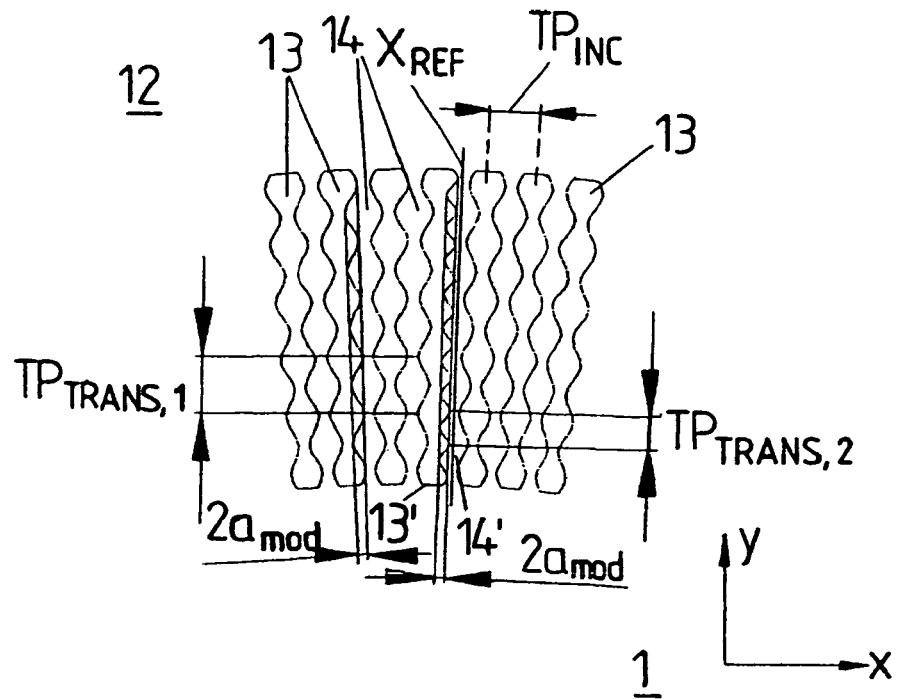
FIG. 2a illustrates a section of a track provided on the graduated disk having an incremental graduation.
Figure 2B:
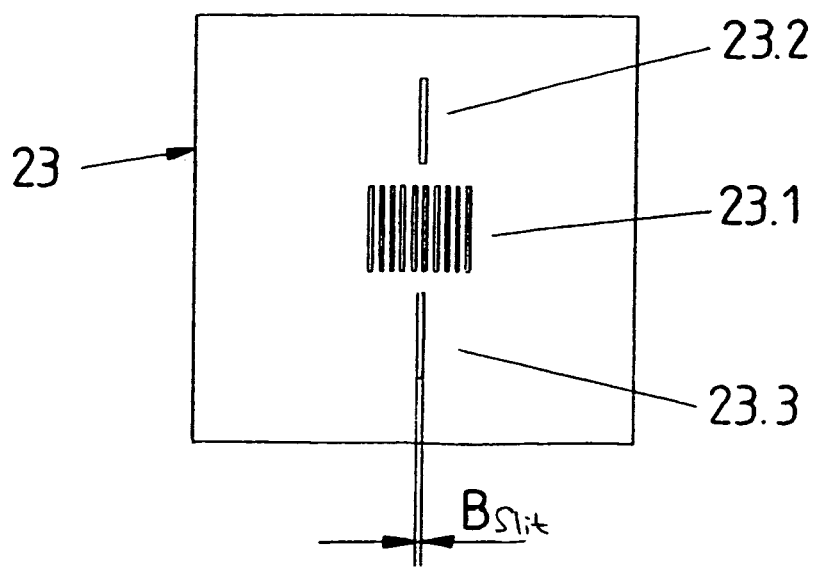

In the case at hand, incremental graduation 13, 14, as may be seen in FIG. 1 in connection with FIG. 2a, is made up of markings 13 and intermediate area 14 arranged between them that are arranged one behind the other periodically having an incremental graduation period $TP_{INC}$ in the measuring direction x, and intermediate areas 14 differ from markings 13 in certain optical properties. Markings 13 and intermediate areas 14 arranged between them are formed similar to a kind of graduation lines, longitudinally extending along a (radial) direction y extending perpendicular to measuring direction x.

In the case at hand, from a track 12 having such an incremental graduation 13, 14 a reference pulse is to be obtained which, even at great tolerances with respect to added construction in the radial direction, may be reliably assigned to a certain (the correct) signal period of the incremental signal. For this, the reference-pulse signal has to be picked off on scale 1 developed as graduation disk, at the same place as the incremental signal, without the strength of incremental signal $TP_{INC}$ being influenced (modulated) by the formation of the reference-pulse signal.

This may be achieved by the generation of a reference-pulse signal using periodically modulated markings and intermediate areas 13, 14, as illustrated in FIGS. 1 and 2a. Accordingly, individual markings 13 and also intermediate areas 14 each have a sinusoidal width modulation having a period $TP_{TRANS,\ 1}$. The width modulation of markings 13 and of intermediate areas 14 brings about that a part of the radiation (in the form of light) of the first and minus first diffraction order in the longitudinal direction y of markings 13 and intermediate areas 14 is ("transversely") deflected, i.e., perpendicular to the longitudinal direction, along which radiation S for obtaining the incremental signal is split up into two partial radiation beams $S_{+1}$ and $S_{-1}$. The angle through which the light is diffracted in the transverse direction depends, in this context, on the period length $TP_{TRANS,\ 1}$ of the width modulation.

In example embodiment illustrated in FIG. 2a, one long side of a marking 13' and accordingly one long side of a directly adjacent intermediate space 14' are modulated using a deviating period length $TP_{TRANS,\ 2}$. In this case, the longitudinal diffraction image in the first transverse diffraction order corresponds essentially to the diffraction image of a gap whose width $2^*a_{mod}$ is twice as great as the amplitude $a_{mod}$ of the width modulation of markings 13 and intermediate areas 14. In this case, a continuum is involved of diffraction orders, that is, a beam spread out correspondingly into a spectrum, which is supplied on first scanning plate 22 to a Fresnel cylindrical lense 22.3. Thereby the continuum forming the beam that is spread out into a spectrum has diffraction orders superimposed on it again in the plane of second scanning plate 23.

The two scanning plates 22 and 23 may be provided, in this context, on the front or rear side of one and the same substrate.

Depending on whether the beams, first spread out into a spectrum and then recombined using Fresnel cylindrical lens 22.3 were deflected by interaction with markings 13 or intermediate areas 14 having a width modulation of the usual period $TP_{TRANS,\ 1}$, or by interaction with the one marking 13' or the one intermediate area 14' having a deviating period $TP_{TRANS,\ 2}$ of the width modulation in the transverse direction, the corresponding beams $S_{T1}$ and $S_{T2}$ impinge on second scanning plate 23 at a first height $h_1$ or a second height $h_2$. Height $h_1$ and $h_2$ correspond, in this context, to the distance from original radiation beam S in the form of a laser beam perpendicular to its spreading direction.

Consequently, the scanning lines of such markings 13 and intermediate areas 14, which are width-modulated at the usual period $TP_{TRANS,\ 1}$, are created at a first height $h_1$ and the image of that scanning line which is brought on by the deviating period $TP_{TRANS,\ 2}$ at a long side of a marking 13' or the corresponding intermediate area 14' is created at a height $h_2$, deviating from the former, on second scanning plate 23.

In this context, for clarity, in FIG. 1, between scale 1 developed as a graduated disk and first scanning plate 22, the splitting up of the original radiation beam S generated by light source 21 in the form of a laser diode, into two radiation beams ST1, ST2, depending on whether the just scanned signal period of the incremental graduation shows a discontinuity, is not illustrated. For this, reference is made to the schematic side view in FIG. 5, which illustrates the course of respective radiation beams ST1, ST2 between scale 1 and the respective detector element 25.1, 25.2.

In the actual operation of the position-measuring device, in each case only one of the two deflected radiation beams ST1, ST2 may be present, depending on whether the currently scanned section of the incremental graduation has a discontinuity or not. In FIGS. 1 and 5, both radiation beams ST1, ST2 are illustrated together in order to make the function of the position-measuring device more clear, especially with respect to the different deflection of the two radiation beams ST1, ST2.

On second scanning plate 23 a slit 23.2 is provided, which is arranged on second scanning plate 23 and extends there at such a length that onto it there impinge both the beams ST1 impinging at first height $h_1$ and the beams ST2 impinging at second height $h_2$. Using this slit 22.3, the radiation is transversely diffracted such that a first detector element 25.1 in the form of a photo element is only reached by beams $S_{T1}$, which go back to an interaction at scale 1 in the form of a graduated disk having markings 13 and intermediate areas 14 of the usual, first transverse period $TP_{TRANS,\ 1}$, whereas the additional detector element 25.2 in the form of a photo element is only reached by those beams $S_{T2}$ which go back to an interaction with the one marking 13' or the assigned intermediate area 14', on whose one long side a deviating transverse period $TP_{TRANS,\ 2}$ of the width modulation is provided. Expressed in other words, first detector element 25.1 is illuminated by beams $S_{T1}$ when the scale is in a position in which the marking 13' and the assigned intermediate area 14' having the deviating transverse period $TP_{TRANS,\ 2}$ are not illuminated at one long side. Second detector element 25.2, by contrast, is illuminated when exactly this one marking 13' and the assigned intermediate area 14' having a deviating transverse period $TP_{TRANS,\ 2}$ are illuminated (at one long side).

Figure 6A:
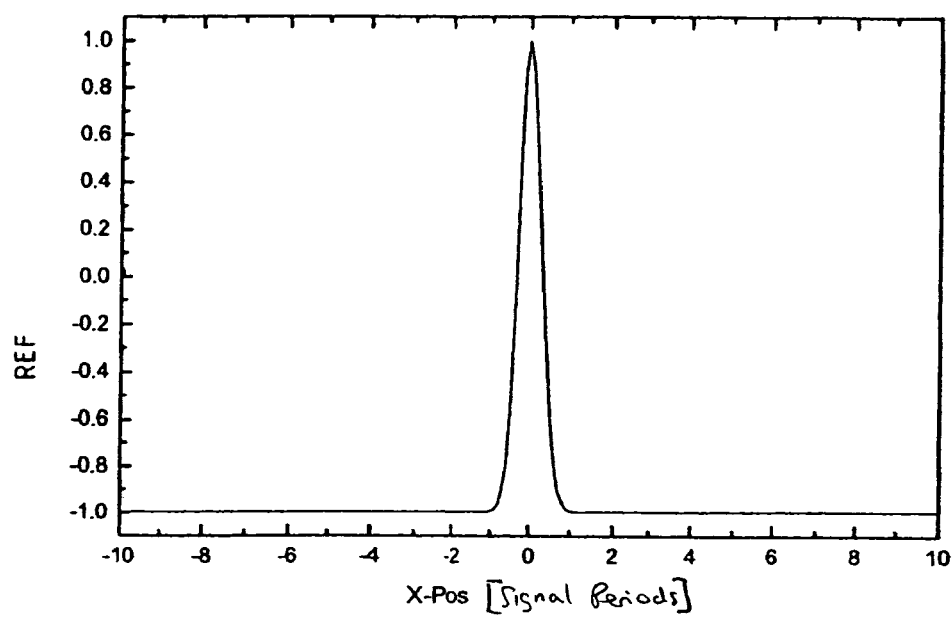
FIGS. 6a to 6c illustrate different reference-pulse signals which are able to be generated using the devices illustrated in FIGS. 1 to 5.

By push-pull connection of the two detector elements 25.1 and 25.2, a characteristic signal pattern, illustrated in FIG. 6a, is generated by crossing of the reference position $x_{REF}$, next to which the long side of marking 13' extends, which has the deviating transverse period $TP_{TRANS,\ 2}$.

Inasmuch as the first scanning plate 22 and the second scanning plate 23 are developed on the front side and the back side of one and the same substrate made of glass, concrete conditions for achieving the conditions described above at detector elements 25.1, 25.2 may be formulated mathematically as follows below. The focal length of the system is dimensioned such that it corresponds to the image of a slit in the scanning range of scale 1 developed as a graduated disk onto slit 23.2 of second scanning plate 23, i.e.:

$$\frac{1}{f} = \frac{1}{a} + \frac{1}{b}.$$

In this context, a and b represent the average distances which beams $S_{T1}$ and $S_{T2}$, which are deflected transversely by diffraction, traverse from scale 1 arranged as a graduated disk to Fresnel cylindrical lens 22.3 on first scanning plate 22 and from Fresnel cylindrical lens 22.3 on first scanning plate 22 to slit 23.2 on second scanning plate 23. Parameters a and b may be calculated as follows, from the wavelength of original radiation beam S developed by laser radiation, from distance $d_1$ from scale 1 developed as a graduated disk and first scanning plate 22, as well as the distance between first scanning plate 22 and second scanning plate 23:

$$a = \frac{1}{2}\frac{d_1}{\sqrt{1-\left(\frac{\lambda}{TP_{TRANS,1}}\right)^2}} + \frac{1}{2}\frac{d_1}{\sqrt{1-\left(\frac{\lambda}{TP_{TRANS,2}}\right)^2}},$$

-continued
$$b = \frac{1}{2n}\frac{d_2}{\sqrt{1-\left(\frac{\lambda}{nTP_{TRANS,1}}\right)^2}} + \frac{1}{2n}\frac{d_2}{\sqrt{1-\left(\frac{\lambda}{nTP_{TRANS,2}}\right)^2}}.$$

It also follows that the longitudinal imaging scale amounts to $-b/a$.

In order for the generated signals to be as free as possible of periodic interference signal having the signal period (half the beam splitting period) of the incremental signal, the width of slit 23.2 on second scanning plate 23 may be selected as follows:

$$B_{slit} = P_{sig} * b/a,$$

where $P_{sig}$ represents the signal period mentioned.

Figure 3A:
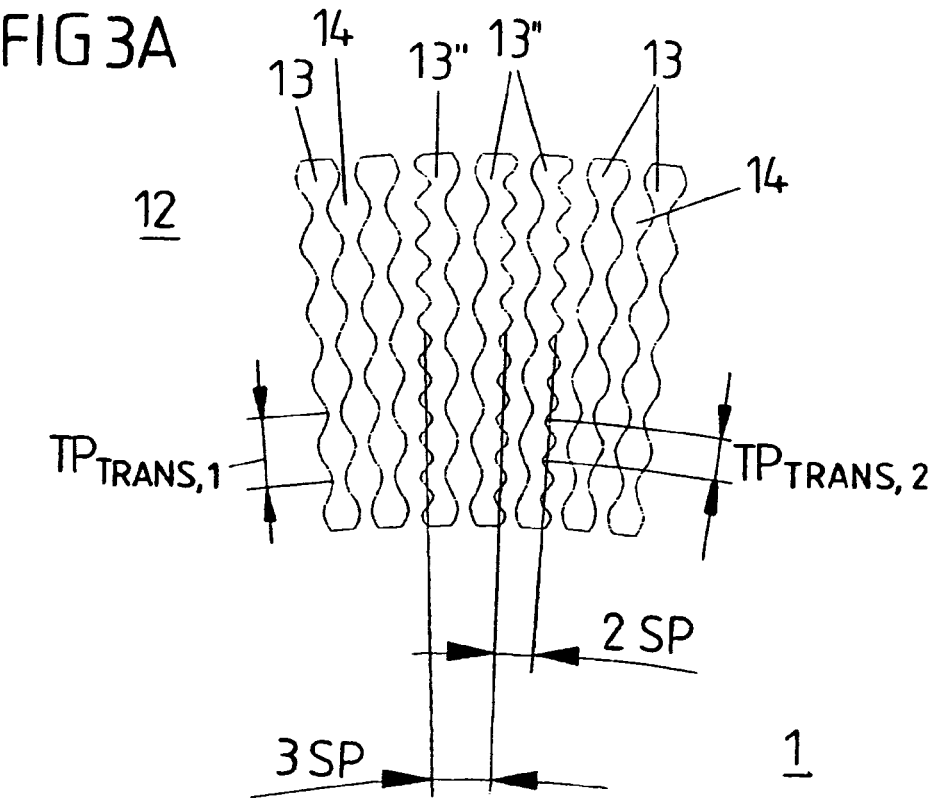

According to an exemplary embodiment of a position-measuring device described above in the light of FIGS. 1, 2a, 2b, 5 and 6a, several markings 13" of an incremental graduation 13, 14 may each have a deviating transverse period $TP_{TRANS,\ 2}$, compare FIG. 3a, where this is the case with three markings 13". The image on second scanning plate 23 then corresponds at second height $h_2$ to the diffraction pattern of a number slit, which agrees with the number of the long sides having a deviating transverse period $TP_{TRANS,\ 2}$. In this context, at first height $h_1$, those positions are illuminated in measuring direction x which remain unilluminated at second height $h_2$, and vice versa.

The distances n*SP between the long sides of markings 13" having a deviating transverse period $TP_{TRANS,\ 2}$ are selected such that between adjacent long sides having a deviating transverse period $TP_{TRANS,\ 2}$ there are in each case different distances, meaning that one and the same distance does not occur in a multiple fashion, compare FIG. 3a.

Figure 3B:
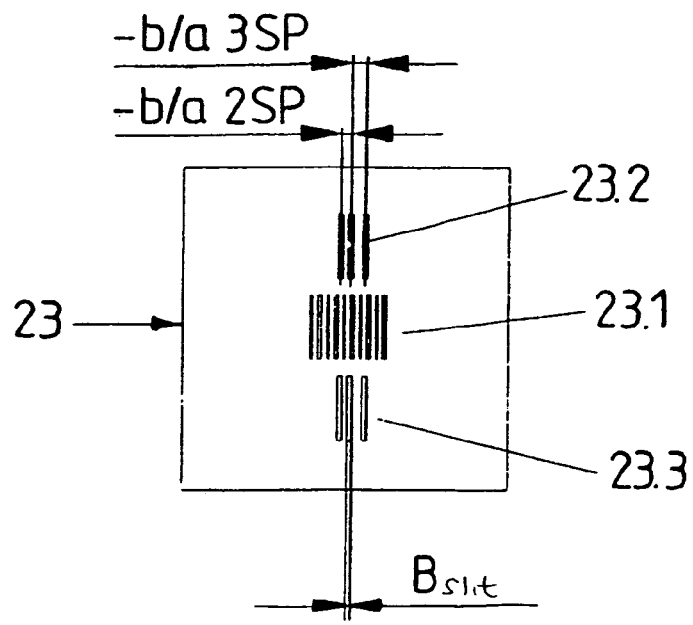
Figure 6B:
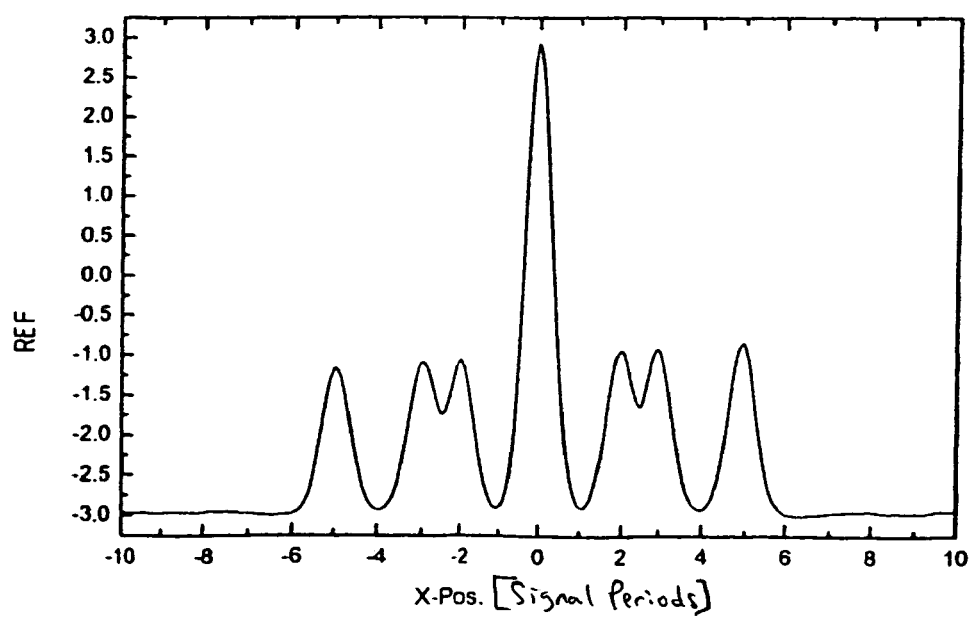

As illustrated in FIG. 3b, on the second scanning plate there is a plurality of slits 23.2, which agrees with the number of long sides of deviating transverse period $TP_{TRANS,\ 2}$. In this context, the distances between adjacent slits 23.2 on second scanning plate 23 correspond to the $-b/a$-fold of the corresponding distances between adjacent long sides having a deviating transverse period $TP_{TRANS,\ 2}$. If scale 1, arranged as a graduated disk, is located, with respect to the position of scanning unit 2, within the signal period in which the reference signal is generated, all slits 23.2 of second scanning plate 23 are illuminated at height $h_2$, and the light transmitted through slit 23.2 falls onto assigned detector element 25.2. The other detector element 25.1 is not illuminated. In all other signal periods, at second height $h_2$ at most one slit is illuminated, i.e., only such radiation falls on corresponding detector element 25.2 as that which before interacted at track 12 with at least one long side having deviating a transverse $TP_{TRANS,\ 2}$, while the remaining radiation impinges on the other detector element 25.1. Thereby, there is an increase in the size of the useful signal by a factor j-1, j indicating the number of the long sides having deviating transverse period $TP_{TRANS,\ 2}$ and the number of slits 23.2 on second scanning plate 23. For values of j greater than or equal to 3, the reference-pulse signal may be reliably detected if one of the long sides of markings 13", having deviating transverse period $TP_{TRANS,\ 2}$, is dirty. A signal pattern that comes about for j=3 is illustrated in FIG. 6b.

Figure 4A:
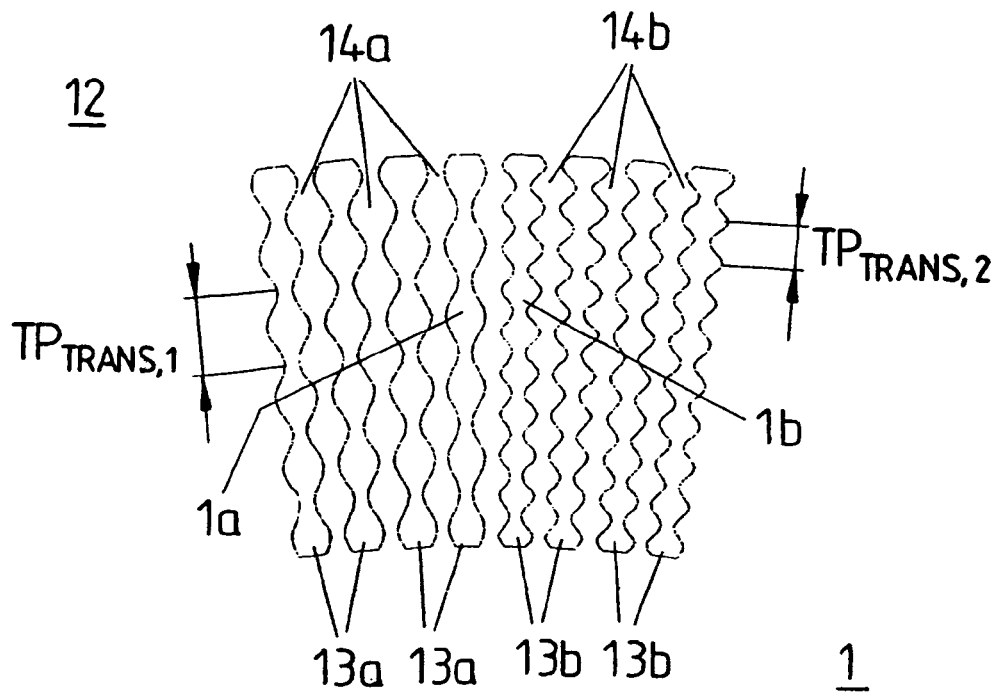
Figure 6C:
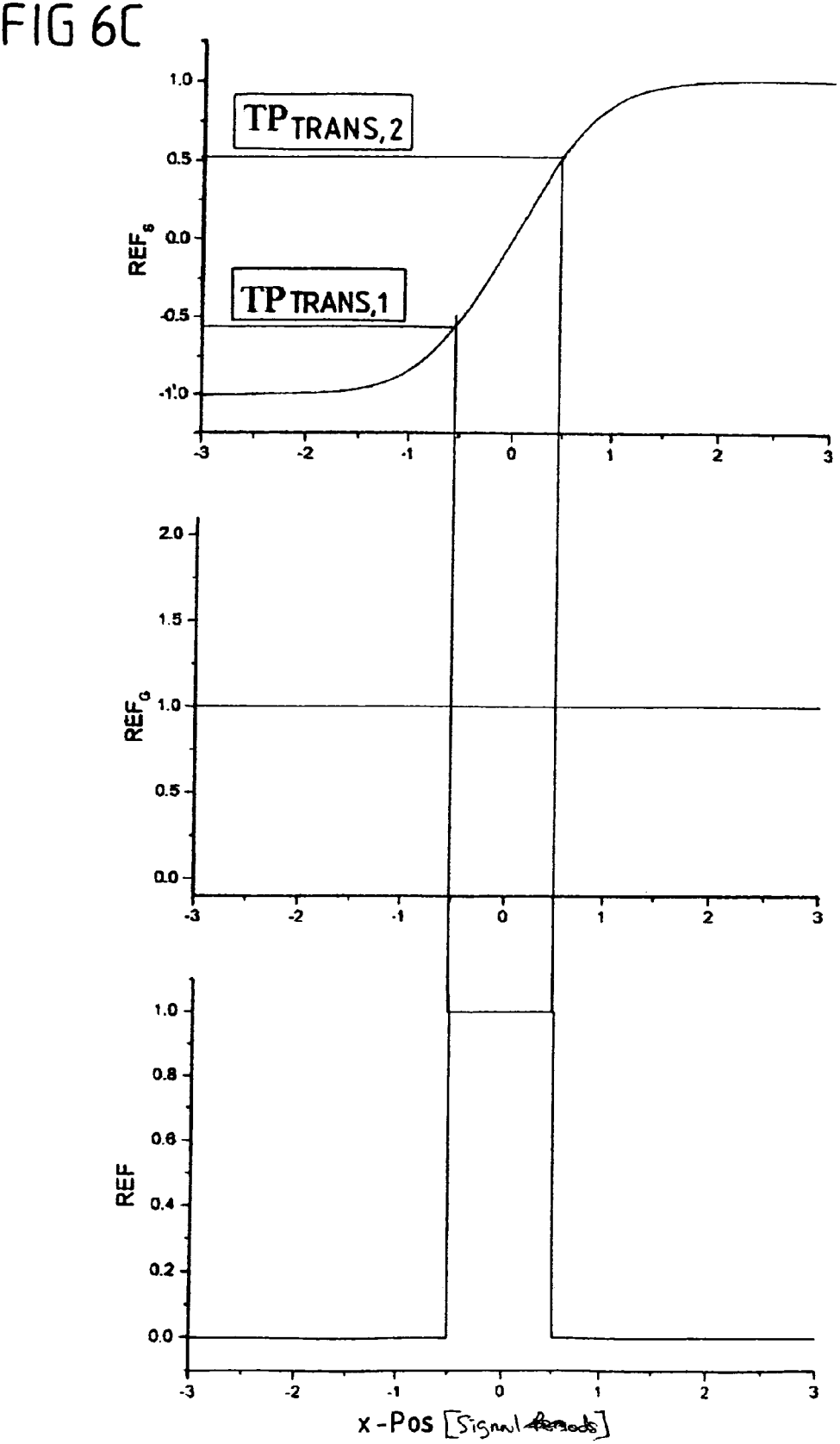

FIG. 4a illustrates an exemplary embodiment with respect to the formation of track 12 from width-modulated markings 13a, 13b, which, besides the generation of reference-pulse signal also permits the formation of a so-called homing signal, so that, after switching on the position-measuring device, a certain, predefined rotational direction may be selected for a reference run. According to that, scale 1 formed by a graduated disk includes at least two sectors 1a, 1b arranged one after another in the circumferential direction, which differ in the transverse period $TP_{TRANS,\ 1}$ or $TP_{TRANS,\ 2}$ of their respective markings and intermediate areas 13a, 14a or 13b, 14b. The transversely diffracted radiation of markings 13a and 13b as well as intermediate areas 14a and 14b of different sectors 1a and 1b is detected by different detector elements 25.1 or 25.2 (compare FIGS. 1 and 5). At the transition between the two sectors 1a and 1b, the signal pattern constructed in the light of FIG. 6c is created if one connects to each other, in push-pull mode, the two detector elements 25.1 and 25.2 that are developed as photo elements.

Figure 4B:
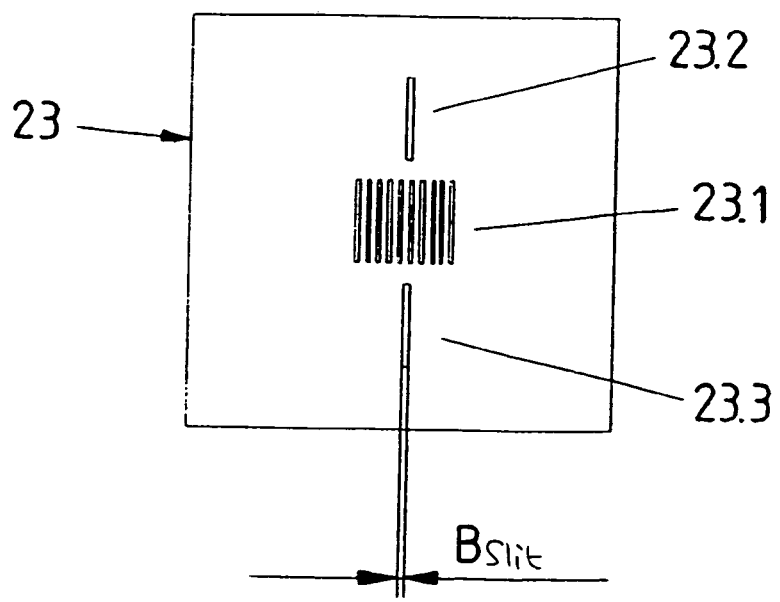

As illustrated in FIG. 4b, in the present exemplary embodiment, second scanning plate 23 includes a slit 23.2 which conforms to corresponding slit 23.2 in the exemplary embodiment explained with the aid of FIG. 2.

As in the case of the preceding exemplary embodiments, the circuit mentioned may be arranged in each case such that the two detector elements 25.1 and 25.2 are arranged as photo elements and connected to each other in push-pull mode. To the two detector elements 25.1, 25.2, a current-to-voltage converter 28.1 as well as an amplifier 29.1 are post-connected, whose output signal (generated from partial reference-pulse signals $REF_1$, $REF_2$ of the two detector elements 25.1, 225.2) is supplied to a comparator 30 as composite reference-pulse signal $REF_S$. On the other hand, a constant light signal $REF_G$, that is generated by an additional detector element 25.3 in the form of a constant-light photo element (having an output signal $REF_S$) and is prepared by a post-connected current-to-voltage converter 28.3 and an amplifier 29.3, is supplied to comparator 30. This is used to regulate the height of the trigger point of comparator 30.

Figure 7:
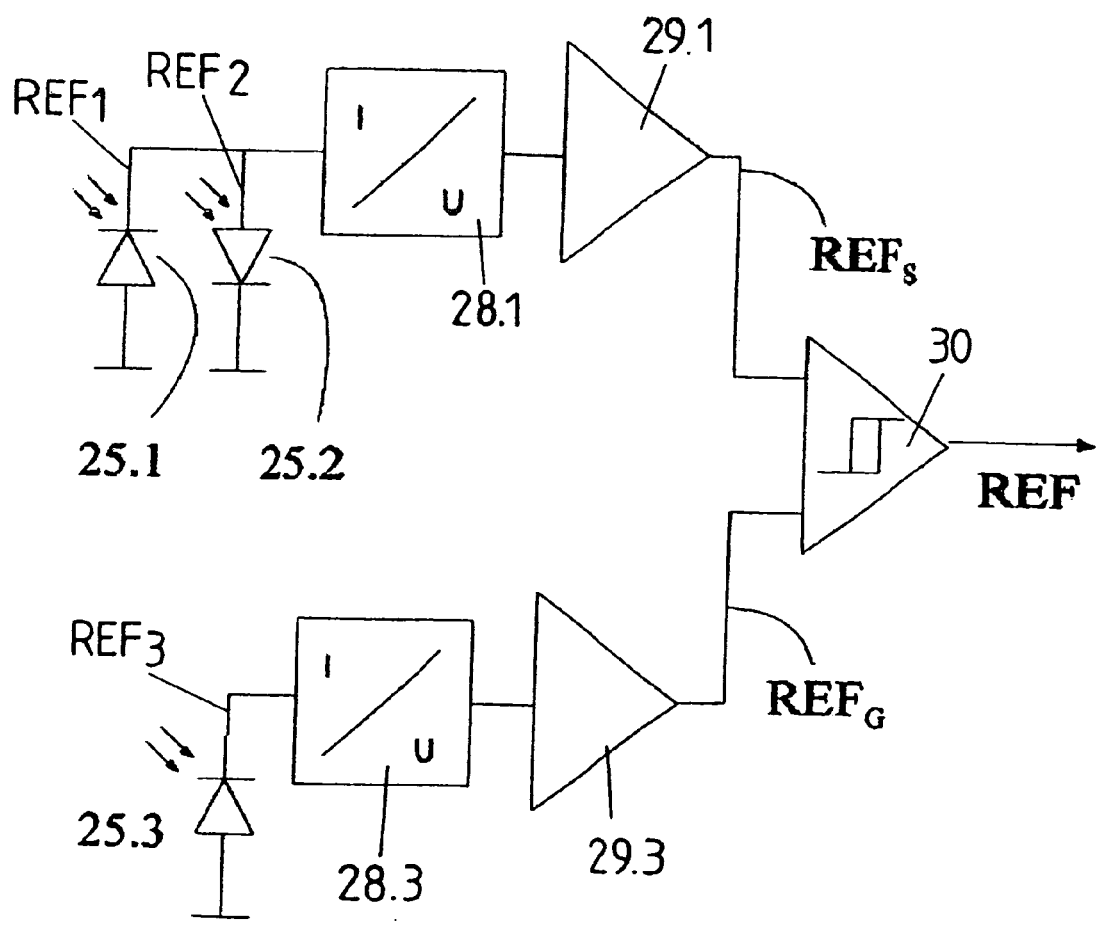
FIG. 7 illustrates a circuit configuration for connecting detector elements of the position-measuring device.

With respect to the generation of constant-light signal $REF_G$ using constant-light detector element 25.3, it may be seen from FIGS. 1 to 5 that radiation beams $S_{T1}$, $S_{T2}$ explained above, which impinge respectively, at a first height $h_1$ or a second height $h_2$, on second scanning plate 23 in the region of at least one slit 23.2, and which are subsequently guided to the one or the other of the two assigned detector elements 25.1, 25.2, because of the symmetrical construction of the system, appear on both sides of partial radiation beams $S_{+1}$ and $S_{-1}$, which are used for generating the incremental signal. Whereas on the one side, as described above, radiation beams $S_{T1}$ and $S_{T2}$ that originate from markings having different transverse periods $TP_{TRANS,\ 1}$ and $TP_{TRANS,\ 2}$, are guided to different detector elements 25.1 and 25.2, on the other side, the corresponding radiation beams are supplied, using a Fresnel cylindrical lens 22.4 of first scanning plate 22 and at least one post-connected slit 23.3 of second scanning plate to a single detector element 25.3 in the form of a constant-light detector element, in order to generate said constant-light signal $REF_G$. In other words, in one of the two created diffraction branches, two detector elements 25.1, 25.2 are provided, which are assigned to the different transverse periods $TP_{TRANS,\ 1}$ and $TP_{TRANS,\ 2}$. In the other diffraction branch, by contrast, a single planar detector element 25.3 is provided which is used for generating a constant-light signal $REF_G$ in the form of a constant-light level of constant intensity, which, as illustrated in FIG. 7, is combined in comparator 30 with composite reference-pulse signal $REF_S$ generated by the first-named detector elements 25.1, 25.2.

From this association, the desired reference-pulse signal REF is generated, as is illustrated, for example, in FIG. 6c, for the case of a graduation of scale 1 that is formed by a graduated disk into at least two sectors 1a, 1b. If, in this case, the composite reference-pulse signal $REF_S$ is between the values which, for transverse period $TP_{TRANS,\ 1}$, are to be expected in the one sector 1a, and for transverse period $TP_{TRANS,\ 2}$, are to be expected in the other sector 1b, then comparator 30 emits a corresponding reference-pulse signal REF, which signals that the position of scale 1 relative to scanning unit 2 is in the signal period characterized by the transition from the one sector 1a to the other sector 1b.

Figure 9A:
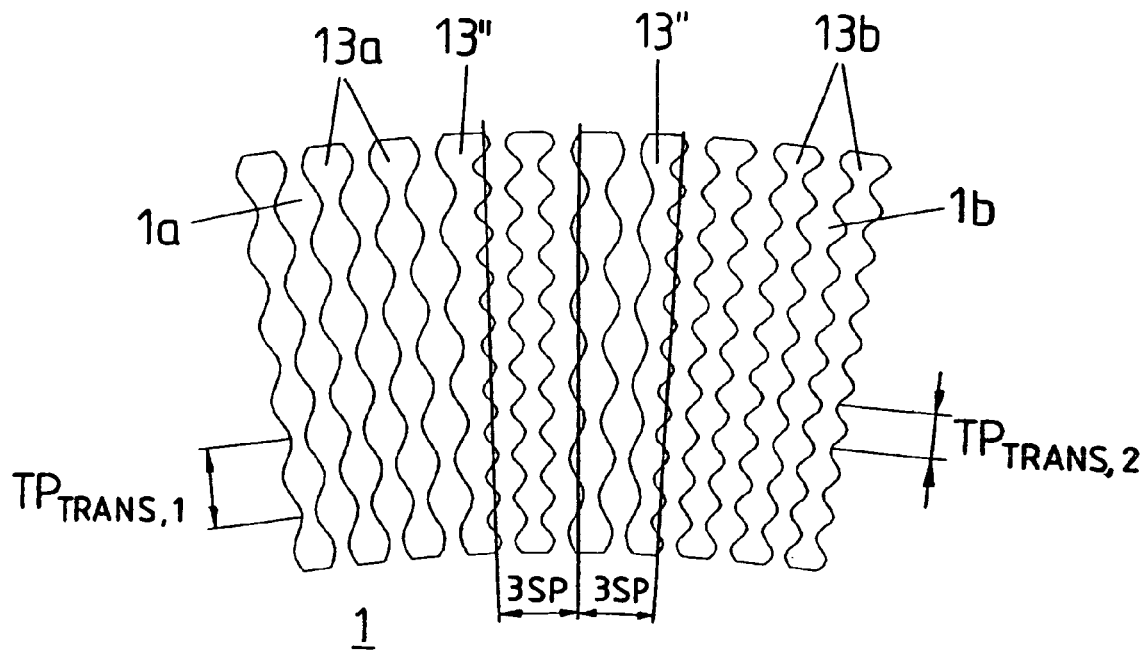
Figure 9B:
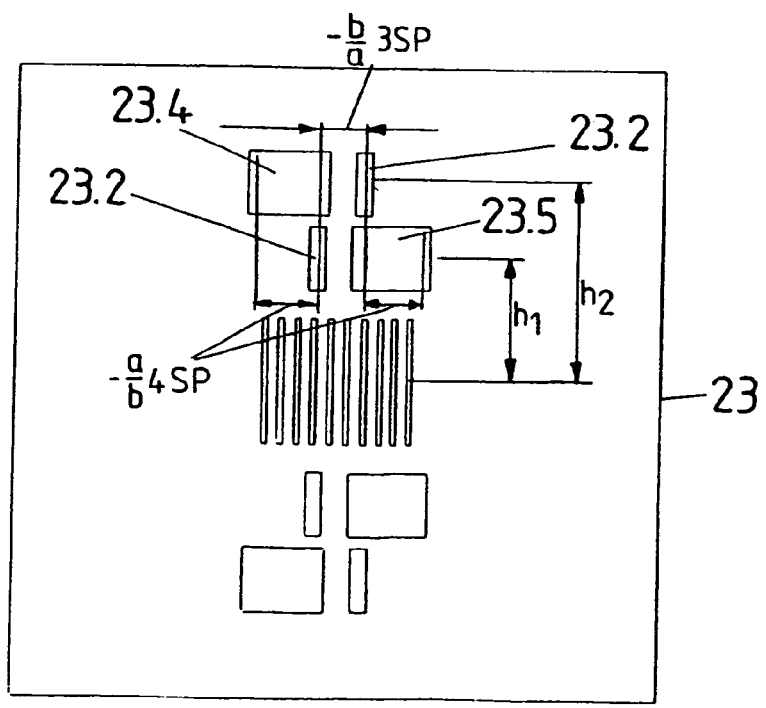

Here, too, it is possible to increase the magnitude of the useful signal. A corresponding exemplary embodiment is illustrated in FIGS. 9a and 9b. In this context, in the transition region between the two sectors 1a, 1b of scale 1 arranged as a graduated disk, two markings 13" are provided, which each have a long side having the first transverse period $TP_{TRANS,\ 1}$ and a long side having the second transverse period $TP_{TRANS,\ 2}$.

Figure 10:
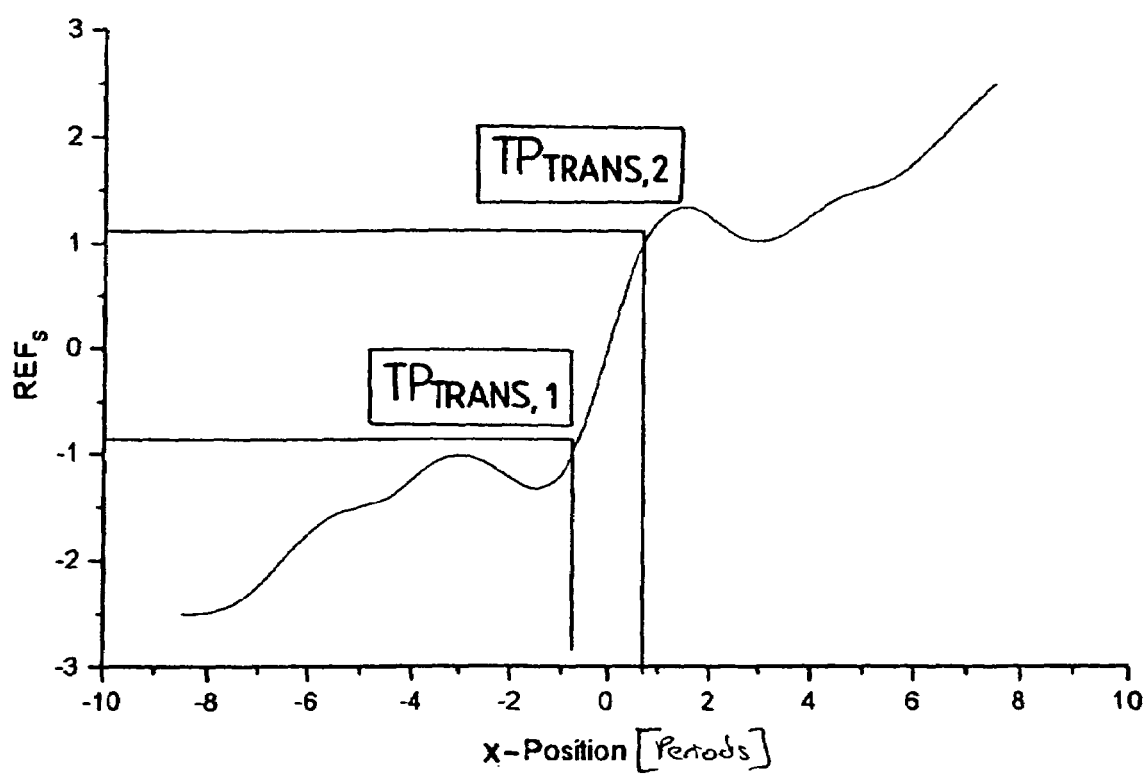
FIG. 10 illustrates a reference-pulse composite signal which is able to be generated with the aid of a position-measuring device when a track as illustrated in FIGS. 9a and 9b is used.

To the markings 13a, 13b having different transverse periods $TP_{TRANS,\ 1}$ and $TP_{TRANS,\ 2}$, as well as to both long sides of a marking 13", which has a different transverse period $TP_{TRANS,\ 1}$ and $TP_{TRANS,\ 2}$ on each long side, there is assigned in the one diffraction branch in each case the other of the two detector elements 25.1 and 25.2. In order that the corresponding composite reference-pulse signal $REF_S$, the curve of which is illustrated in FIG. 10, may not exceed the threshold outside the transition region between the two sectors 1a, 1b which applies to transverse period $TP_{TRANS,\ 1}$ of the one sector 1a, or may not undershoot the threshold which applies to transverse period $TP_{TRANS,\ 2}$ of the other sector 1b, the scanning plate has windows 23.4 and 23.5 arranged next to the corresponding slits 23.2, which transmit still further radiation (originating from the interaction with additional markings, such as three long sides of markings 13a, 13b of track 12).

The size of windows 23.4, 23.5, as well as their position with respect to each respective slit 23.2, as a function of signal period SP of the incremental graduation, may be seen in FIGS. 9a and 9b.

Thus, in the transition region, forming the reference-pulse signal, between the two sectors 1a, 1b, on the one side the transversely diffracted light of at least two long sides of markings having the first transverse period $TP_{TRANS,\ 1}$ impinges on first detector element 25.1, while on the other side the transversely diffracted light of at least two long sides of markings having the second transverse period $TP_{TRANS,\ 2}$ impinges on second detector element 25.2. The curve of the signal resulting from this of composite reference-pulse signal $REF_S$ is illustrated in FIG. 10.

Figure 11:
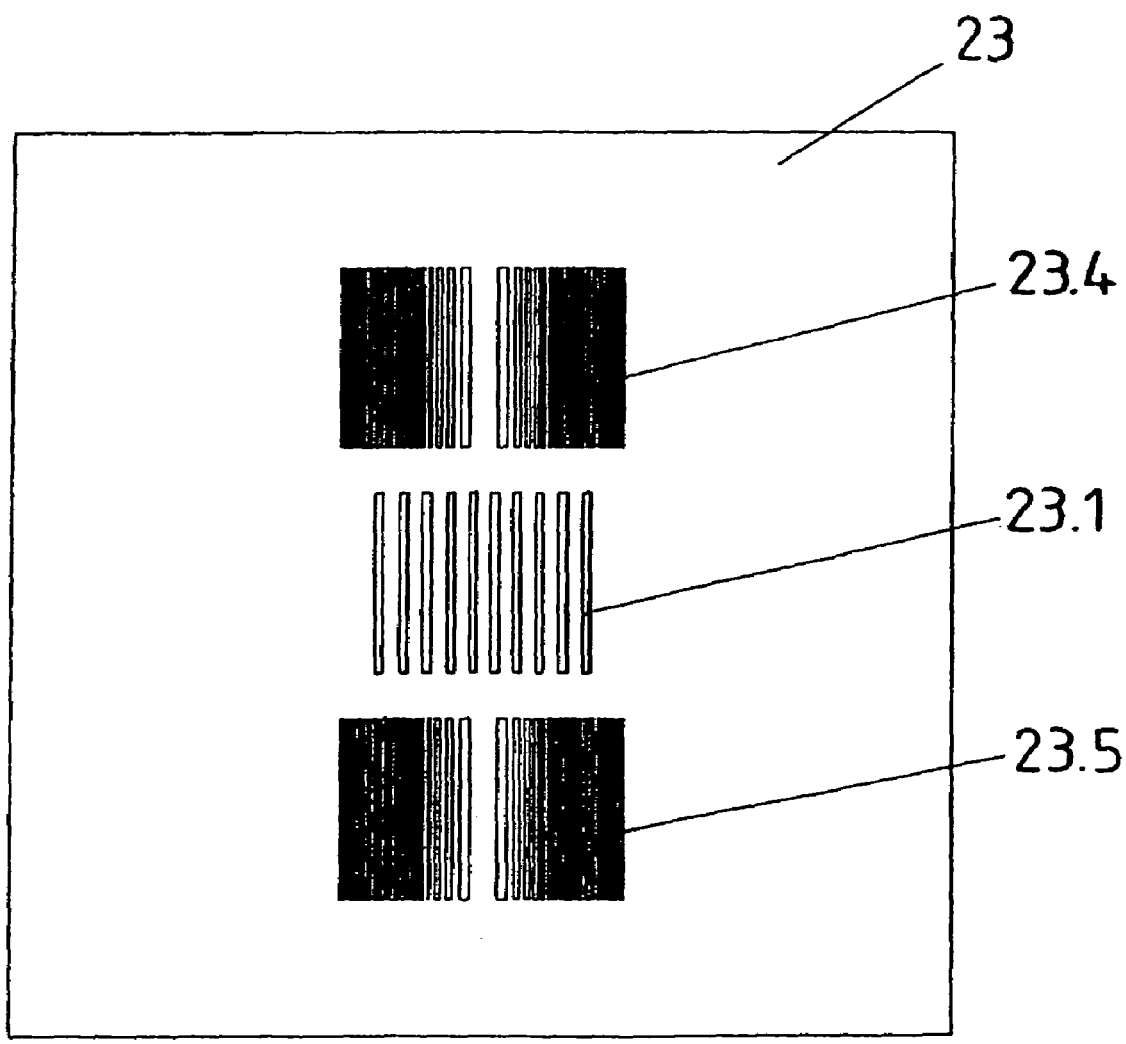
FIG. 11 illustrates an example embodiment of a the scanning plates illustrated in FIGS. 2b, 3b, 4b and 9b, which includes Fresnel cylindrical lenses.

Deviating from the exemplary embodiments described above, it is possible that the markings having different transverse periods $TP_{TRANS,\ 1}$ and $TP_{TRANS,\ 2}$ not onto second scanning plate 23, but onto any other plane, e.g., also the plane in which detector elements 25.1, 25.2 are located. In this case, it may be provided to position a second Fresnel cylindrical lens 23.4 on second scanning plate 23, instead of at least one slit 23.2 for the diffraction of the transversely deflected light as illustrated in FIG. 11. The two Fresnel cylindrical lenses 22.3, 23.4 then form a cylindrical telescope, using which a large imaging scale may be achieved in the imaging onto the plane of detector elements 25.1, 25.2.

The function of the at least one slit 23.2, which, in the exemplary embodiments described above, is in each case provided on the second scanning plate 23, is assumed by at least one slit directly above detector elements 25.1, 25.2. In a corresponding manner, the aperture function may be assumed by a suitably structured sensor. The shape of its active surface is similar to the shape of the respective slit 23.2 or respective slit 23.2 in the exemplary embodiments described above. Thereby position-measuring devices having a small type of construction may be implemented, even with the use of comparatively coarse detector structures.

In this case too, a beam path for obtaining a constant light signal extends symmetrically to the system described above, in this beam path, too, two Fresnel cylindrical lenses 22.4, 23.5 being arranged one behind the other, and to this beam path there is assigned its own photo element 25.3, onto which both diffraction branches of the corresponding beam path impinge.

Figure 8:
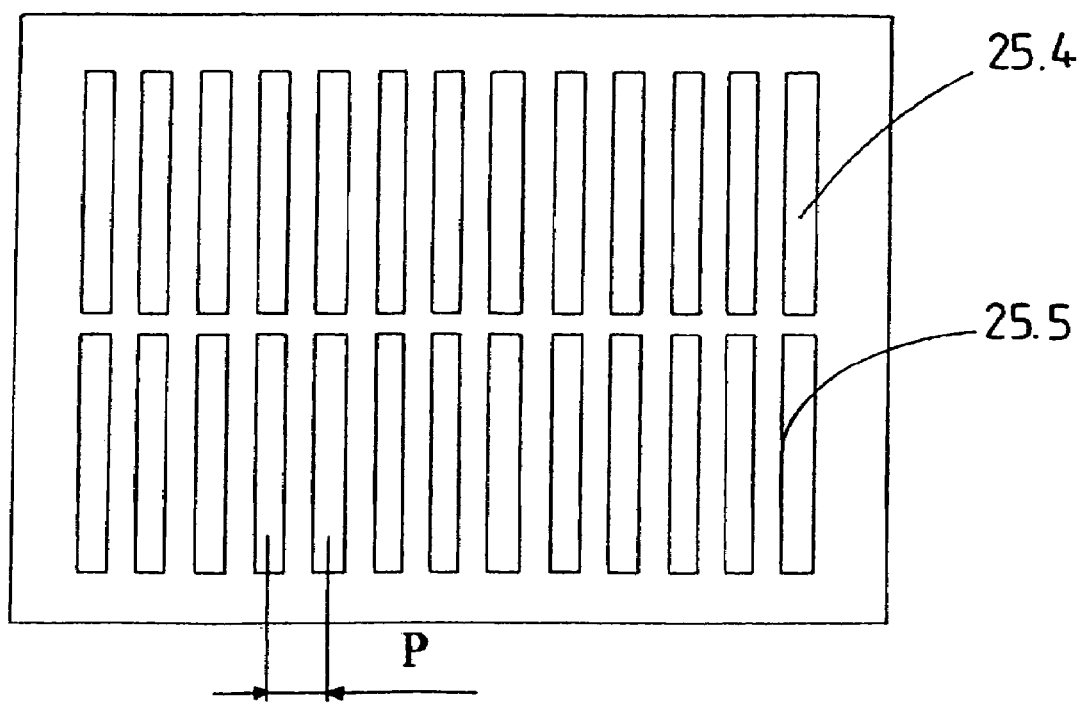
FIG. 8 illustrates a detector element for use during the development of a track of the position-measuring device as a code track having absolute position information.

Furthermore, on the basis of the previously described arrangements of markings 13 and intermediate areas 14 of an incremental graduation, it is possible to construct a position-measuring device having absolute position information by using different transverse periods $TP_{TRANS,\ 1}$ and $TP_{TRANS,\ 2}$. For this, in conformance to a PRC code, along the measuring direction x, certain long sides of markings are provided with at least one deviating transverse period $TP_{TRANS,\ 2}$, whereas the remaining long sides have the usual transverse period $TP_{TRANS,\ 1}$. The images of the slit which are producible by the deviating transverse period $TP_{TRANS,\ 2}$, are imaged, using the telescope optics, described further above, that is based on two Fresnel cylinder lenses arranged one behind the other in the beam path, on an ASIC, as illustrated in FIG. 8. Long sides of markings having the one, usual transverse period $TP_{TRANS,\ 1}$ are imaged on first active surfaces 25.4 of the ASIC, whereas the long sides having the deviating transverse period $TP_{TRANS,\ 2}$ are imaged in a modulated manner on two active surfaces 25.5 of the ASIC. The first and second active surfaces 25.4, 25.5 of the ASIC are connected to each other in push-pull mode.

First and second active surfaces 25.4, 25.5 are each made up, in this context, of subareas arranged one behind the other periodically, having a period P. In this context, the corresponding period P is given by the product of the imaging scale of the telescope optics used and the signal period. From the output signals of the push-pull-connected active surface pairs, the respective absolute position of scale 1 with respect to scanning unit 2 is ascertained by using a table.

According to an example embodiment, the markings forming the incremental track may also be provided with three or more different transverse periods. Thereby an absolute code may be distributed to two tracks. This makes possible the coding of comparatively long measuring paths as well as the generation of increased redundancy for improved reliability.

In the exemplary embodiments described above, the incremental graduation is in each case arranged as a transmitted light graduation or a phase grating. Alternatively, amplitude gratings or structures may also be used. It is possible to implement a reflected light system instead of a transmitted light system.

The transverse substructure of the incremental graduation is formed in all the cases described by the width modulation of markings 13 and intermediate areas 14. In each case, these have at their long sides a periodic, sine-shaped contour boundary along their respective longitudinal direction y. The periodicity of the contour boundaries corresponds to the respective transverse periods $TP_{TRANS,\ 1}$ and $TP_{TRANS,\ 2}$.

Because of these transverse substructures, besides the longitudinal deflecting or splitting of the radiation beams used for generating the incremental signals in the measuring direction x, there also comes about the transverse deflection required for the generation of reference-pulse signal REF.

In this context, a sine-shaped contour boundary may provide that the intensity of the incremental signal is not so greatly impaired by the generation of the reference-pulse signal. The reason for this is the low field strength of the first and minus first longitudinal diffraction order at the locations of the transverse grating structures. The extension of the sinusoidal contour boundaries in measuring direction x, i.e., the modulation amplitude of the respective sine function, determines the distribution proportion of the light intensities for the utilized sub-beams of rays of the reference-mark scanning and the incremental-signal scanning. This distribution proportion ratio may be set by the selection of the modulation period of the sine function.

Apart from sinusoidally designed contour boundaries, other periodic, transverse substructures may be used in which the long sides of the markings (contour boundaries) are shaped triangular, for example. Furthermore, the modulation amplitude of the contour boundaries and long sides of the markings may be selected to be so large that adjacent markings in the measuring direction x touch, and a cross grating having rhombic structures results.

In addition, a transverse substructure of the individual markings, e.g., with respect to very short modulation periods, may be formed in that the markings, along the longitudinal direction y (transverse to the measuring direction x) are formed of a plurality of graduation markings arranged one after another along the longitudinal direction y. In the case of transmitted light division, periodic (alternating) light-transmitting and light-non-transmitting graduation markings may then follow one another, for example, in longitudinal direction y of the respective markings. Thereby, too, the attempted modulation effect transverse to the measuring direction x may be achieved.

What is claimed is:

1. A position-measuring device for generating measuring signals, comprising:
    a track including an incremental graduation having a specified graduation period and extending along a measuring direction, at least one discontinuity of the incremental graduation arranged at a reference position to generate a reference signal;
    a scanning unit configured to scan the incremental graduation by radiation beams, one of (a) the track and (b) the scanning unit movable relative to the other one of (a) the track and (b) the scanning unit along the measuring direction; and
    at least one imaging optics system;
    wherein the at least one discontinuity is formed by a modification of the incremental graduation, extending perpendicular to the measuring direction, of the incremental graduation arranged to deflect radiation beams that originate from the scanning unit, a deflection direction deviating at the discontinuity from a deflection direction in other regions of the incremental graduation;
    wherein the scanning unit includes at least one reference-pulse detector element configured to receive one of the radiation beams having different deflection directions; and
    wherein the at least one imaging optics system is arranged in a beam path of a respective deflected radiation beam, the at least one imaging optics system configured to image a slit from the incremental graduation onto a further slit located in a defined image plane.

2. The position-measuring device according to claim 1, wherein the imaging optics system is configured to image areas of the track irradiated by the scanning unit, and includes at least one cylindrical lens.

3. The position-measuring device according to claim 2, wherein the at least one cylindrical lens includes a Fresnel cylindrical lens.

4. The position-measuring device according to claim 2, wherein the imaging optical system includes at least two cylindrical lenses arranged sequentially in the beam path of the deflected radiation beams.

5. The position-measuring device according to claim 1, wherein the at least one reference-pulse detector element is located in the image plane.

6. The position-measuring device according to claim 1, wherein the scanning unit includes at least two reference-pulse detector elements for radiation beams having different deflection directions.

7. The position-measuring device according to claim 6, wherein the at least two reference-pulse detector elements are arranged in one plane.

8. The position-measuring device according to claim 1, wherein the incremental graduation includes periodic markings intermediate areas arranged between the periodic markings.

9. The position-measuring device according to claim 8, wherein exactly one of the periodic markings deviates from other periodic markings and that defines the discontinuity.

10. The position-measuring device according to claim 8, wherein a plurality of the periodic markings is arranged in a surrounding area of the at least one reference position corresponding to the discontinuity and deviates from other periodic markings and that defines the discontinuity.

11. The position-measuring device according to claim 8, wherein the track includes at least two sectors, each sector including a different incremental graduation.

12. The position-measuring device according to claim 1, wherein the the incremental graduation is configured to form two diffraction branches from the radiation beam emitted by the scanning unit, a first diffraction branch including radiation beams deflected by the incremental graduation and supplied to respective first reference-pulse detector elements, a second diffraction branch including radiation beams supplied to a second reference-pulse detector element in a uniform manner.

13. The position-measuring device according to claim 12, wherein the second reference-pulse detector element is configured to generate a constant light level.

14. The position-measuring device according to claim 12, further comprising an arrangement configured to combine output signals of the first reference-pulse detector elements and an output signal of the second reference-pulse detector element to generate a reference-pulse signal.

15. The position-measuring device according to claim 14, wherein the arrangement includes a comparator.

16. The position-measuring device according to claim 12, wherein an imaging optics is arranged in each beam path of the two diffraction branches.

17. A position-measuring device for generating measuring signals, comprising:
a track including an incremental graduation having a specified graduation period and extending along a measuring direction, at least one discontinuity of the incremental graduation arranged at a reference position to generate a reference signal;
a scanning unit configured to scan the incremental graduation by radiation beams, a first one of (a) the track and (b) the scanning unit movable relative to a second one of (a) the track and (b) the scanning unit along the measuring direction; and
at least one imaging optics system;
wherein the at least one discontinuity is formed by a modification of the incremental graduation, extending perpendicular to the measuring direction, of the incremental graduation arranged to deflect radiation beams that originate from the scanning unit, a deflection direction deviating at the discontinuity from a deflection direction in other regions of the incremental graduation;
wherein the scanning unit includes at least one reference-pulse detector element configured to receive one of the radiation beams having different deflection directions;
wherein the at least one imaging optics system is arranged in a beam path of a respective deflected radiation beam;
wherein the imaging optics system is configured to image areas of the track that is irradiated by the scanning unit, onto a predefined imaging plane; and
wherein the imaging plane includes at least one slit on which the radiation beams having different deflection directions is arranged to impinge and which is arranged to supply the radiation beams having the different deflection directions to different reference-pulse detector elements.

18. The position-measuring device according to claim 17, wherein the differently deflected radiation beams are arranged to impinge on different locations of the slit.

19. The position-measuring device according to claim 18, wherein the differently deflected radiation beams are arranged to impinge upon different places along an extension direction of the slit.

20. The position-measuring device according to claim 17, wherein the at least one slit extends in a direction perpendicular to the measuring direction.

21. The position-measuring device according to claim 17, wherein the imaging optics system is configured to image areas of the track that is irradiated by the scanning unit, and includes at least one cylindrical lens.

22. The position-measuring device according to claim 21, wherein the at least one cylindrical lens includes a Fresnel cylindrical lens.

23. The position-measuring device according to claim 21, wherein the imaging optical system includes at least two cylindrical lenses arranged sequentially in the beam path of the deflected radiation beams.

24. The position-measuring device according to claim 17, wherein the imaging plane is arranged in the beam path of the radiation beams at a distance from the at least one reference-pulse detector element.

25. The position-measuring device according to claim 17, wherein the at least one reference-pulse detector element is substantially located in the imaging plane.

26. The position-measuring device according to claim 17, wherein the scanning unit includes at least two reference-pulse detector elements for radiation beams having different deflection directions.

27. The position-measuring device according to claim 26, wherein the at least two reference-pulse detector elements are arranged in one plane.

28. The position-measuring device according to claim 17, wherein the incremental graduation includes periodic markings, intermediate areas arranged between the periodic markings.

29. The position-measuring device according to claim 28, wherein exactly one of the periodic markings deviates from other periodic markings and that defines the discontinuity.

30. The position-measuring device according to claim 28, wherein a plurality of the periodic markings is arranged in a surrounding area of the at least one reference position corresponding to the discontinuity and deviates from other periodic markings and that defines the discontinuity.

31. The position-measuring device according to claim 28, wherein the track includes at least two sectors, each sector including a different incremental graduation.

32. The position-measuring device according to claim 17, wherein the incremental graduation is configured to form two diffraction branches from the radiation beam emitted by the scanning unit, a first diffraction branch including radiation beams deflected by the incremental graduation and supplied to respective first reference-pulse detector elements, a second diffraction branch including radiation beams supplied to a second reference-pulse detector element in a uniform manner.

33. The position-measuring device according to claim 32, wherein the second reference-pulse detector element is configured to generate a constant light level.

34. The position-measuring device according to claim 32, further comprising an arrangement configured to combine output signals of the first reference-pulse detector elements and an output signal of the second reference-pulse detector element to generate a reference-pulse signal.

35. The position-measuring device according to claim 34, wherein the arrangement includes a comparator.

36. The position-measuring device according to claim 32, wherein an imaging optics is arranged in each beam path of the two diffraction branches.

37. A position-measuring device for generating measuring signals, comprising:
  a track including an incremental graduation having a specified graduation period and extending along a measuring direction, at least one discontinuity of the incremental graduation arranged at a reference position to generate a reference signal;
  a scanning unit configured to scan the incremental graduation by radiation beams, a first one of (a) the track and (b) the scanning unit movable relative to a second one of (a) the track and (b) the scanning unit along the measuring direction; and
  at least one imaging optics system;
  wherein the at least one discontinuity is formed by a modification of the incremental graduation, extending perpendicular to the measuring direction, of the incremental graduation arranged to deflect radiation beams that originate from the scanning unit, a deflection direction deviating at the discontinuity from a deflection direction in other regions of the incremental graduation;
  wherein the scanning unit includes at least one reference-pulse detector element configured to receive one of the radiation beams having different deflection direction;
  wherein the at least one imaging optics system is arranged in a beam path of a respective deflected radiation beam;
  wherein the imaging optics system is configured to image areas of the track that is irradiated by the scanning unit, onto a predefined imaging plane; and
  wherein the imaging plane is arranged in the beam path of the radiation beams at a distance from the at least one reference-pulse detector element.

38. The position-measuring device according to claim 37, wherein the imaging optics system is configured to image areas of the track that is irradiated by the scanning unit, and includes at least one cylindrical lens.

39. The position-measuring device according to claim 38, wherein the at least one cylindrical lens includes a Fresnel cylindrical lens.

40. The position-measuring device according to claim 38, wherein the imaging optical system includes at least two cylindrical lenses arranged sequentially in the beam path of the deflected radiation beams.

41. The position-measuring device according to claim 37, wherein the at least one reference-pulse detector element is located in the imaging plane.

42. The position-measuring device according to claim 37, wherein the scanning unit includes at least two reference-pulse detector elements for radiation beams having different deflection directions.

43. The position-measuring device according to claim 42, wherein the at least two reference-pulse detector elements are arranged in one plane.

44. The position-measuring device according to claim 37, wherein the incremental graduation includes periodic markings, intermediate areas arranged between the periodic markings.

45. The position-measuring device according to claim 44, wherein exactly one of the periodic markings deviates from other periodic markings and that defines the discontinuity.

46. The position-measuring device according to claim 44, wherein a plurality of the periodic markings is arranged in a surrounding area of the at least one reference position corresponding to the discontinuity and deviates from other periodic markings and that defines the discontinuity.

47. The position-measuring device according to claim 44, wherein the track includes at least two sectors, each sector including a different incremental graduation.

48. The position-measuring device according to claim 37, wherein the incremental graduation is configured to form two diffraction branches from the radiation beam emitted by the scanning unit, a first diffraction branch including radiation beams deflected by the differential graduation and supplied to respective first reference-pulse detector elements, a second diffraction branch including radiation beams supplied to a second reference-pulse detector element in a uniform manner.

49. The position-measuring device according to claim 48, wherein the second reference-pulse detector element is configured to generate a constant light level.

50. The position-measuring device according to claim 48, further comprising an arrangement configured to combine output signals of the first reference-pulse detector elements and an output signal of the second reference-pulse detector element to generate a reference-pulse signal.

51. The position-measuring device according to claim 50, wherein the arrangement includes a comparator.

52. The position-measuring device according to claim 48, wherein an imaging optics is arranged in each beam path of the two diffraction branches.

53. A method for position-measurement with a track that includes an incremental graduation extending along a measuring direction and including a predefined graduation period, the track including at least one reference position having a discontinuity arranged to generate a reference signal, the discontinuity formed by a modification of the incremental graduation of the track that extends perpendicular to the measuring direction, comprising:
  moving the track along the measuring direction relative to a scanning unit;

scanning the track with the scanning unit;

deflecting, by an imaging optics system, radiation beams that originate from the scanning unit to image a slit from the incremental graduation track onto a further slit in a predefined image plane, a deflection direction at the discontinuity deviating from a deflection direction at other locations of the track; and receiving the deflected radiation beams at a respective reference-pulse detector element of the scanning unit.

54. The method according to claim 53, wherein the radiation beams are deflected in the deflecting step by diffraction.

55. The method according to claim 53, further comprising imaging the incremental graduation by the imaging optics system onto a plane.

56. The method according to claim 53, further comprising:

forming two diffraction branches from the radiation beam emitted by the scanning unit by the incremental graduation;

supplying radiation beams included in a first diffraction branch and deflected by the incremental graduation to a respective first reference-pulse detector element; and supplying radiation beams included in a second diffraction branch to a second reference-pulse detector element in a uniform manner.

57. The method according to claim 53, further comprising combining output signals of the first reference-pulse detector elements with an output signal of the second reference-pulse detector element to generate a reference-pulse signal.

* * * * *